(12) United States Patent
Eyring et al.

(10) Patent No.: US 11,500,736 B2
(45) Date of Patent: Nov. 15, 2022

(54) SYSTEMS AND METHODS FOR SMART HOME DATA STORAGE

(71) Applicant: Vivint, Inc., Provo, UT (US)

(72) Inventors: Matthew J. Eyring, Provo, UT (US); Jeremy B. Warren, Draper, UT (US); James Ellis Nye, Alpine, UT (US)

(73) Assignee: VIVINT, INC., Provo, UT (US)

( * ) Notice: Subject to any disclaimer, the term of this patent is extended or adjusted under 35 U.S.C. 154(b) by 358 days.

(21) Appl. No.: 14/818,954

(22) Filed: Aug. 5, 2015

(65) Prior Publication Data

US 2017/0039111 A1    Feb. 9, 2017

(51) Int. Cl.
*G06F 16/30* (2019.01)
*G06F 11/14* (2006.01)

(52) U.S. Cl.
CPC ...... *G06F 11/1464* (2013.01); *G06F 11/1448* (2013.01); *G06F 2201/84* (2013.01)

(58) Field of Classification Search
CPC ....... G06F 16/258; G06F 16/489; G06F 16/27
USPC ........ 707/609, 687, 705, 769, 790, 813, 821
See application file for complete search history.

(56) References Cited

U.S. PATENT DOCUMENTS

| | | | |
|---|---|---|---|
| 7,607,582 B2 | 10/2009 | Vallabh et al. | |
| 7,997,494 B2 | 8/2011 | Duncan | |
| 8,538,376 B2 | 9/2013 | Lee et al. | |
| 8,819,182 B2 | 8/2014 | Howarter et al. | |
| 9,720,989 B2* | 8/2017 | Theimer | G06F 16/258 |
| 2005/0086443 A1 | 4/2005 | Mizuno et al. | |
| 2006/0200541 A1* | 9/2006 | Wikman | H04L 67/32 709/223 |
| 2007/0185936 A1 | 8/2007 | Derk et al. | |
| 2010/0142448 A1* | 6/2010 | Schlicht | H04W 28/021 370/328 |
| 2010/0235891 A1* | 9/2010 | Oglesbee | H04L 67/1095 726/5 |
| 2010/0321500 A1* | 12/2010 | Cornett | G01S 7/4802 382/106 |
| 2011/0029522 A1 | 2/2011 | Tyagi et al. | |
| 2012/0130513 A1 | 5/2012 | Hao et al. | |
| 2012/0313746 A1* | 12/2012 | Rahman | G06F 15/00 340/5.1 |
| 2012/0317507 A1* | 12/2012 | Gutierrez | H04N 7/181 715/771 |
| 2013/0091213 A1* | 4/2013 | Diab | G06Q 50/01 709/204 |
| 2013/0219459 A1 | 8/2013 | Bradley | |
| 2013/0326379 A1 | 12/2013 | Arrasvuori et al. | |
| 2014/0009284 A1 | 1/2014 | Slavin et al. | |
| 2014/0188804 A1 | 7/2014 | Gokhale et al. | |

(Continued)

OTHER PUBLICATIONS

PCT International Search Report for International Application No. PCT/US2016/045741, dated Nov. 28, 2016 (3 pp.).

(Continued)

*Primary Examiner* — Sana A Al-Hashemi
(74) *Attorney, Agent, or Firm* — Kunzler Bean & Adamson

(57) ABSTRACT

System and methods for storing data include detecting presence of one or more computing devices within a defined geographic area, automatically copying media stored on the one or more computing devices, storing the copied media on a backup storage device, and grouping the stored copied media by at least one of time period, location, event and a source of the copied media.

20 Claims, 9 Drawing Sheets

(56) References Cited

U.S. PATENT DOCUMENTS

| | | | |
|---|---|---|---|
| 2014/0210640 A1* | 7/2014 | Rahman | G06F 1/163 |
| | | | 340/870.16 |
| 2014/0236468 A1* | 8/2014 | Dave | G01C 21/3679 |
| | | | 701/300 |
| 2015/0067353 A1 | 3/2015 | Hui | |
| 2015/0084769 A1* | 3/2015 | Messier | G08B 21/0446 |
| | | | 340/539.13 |
| 2015/0186497 A1* | 7/2015 | Patton | G06F 16/48 |
| | | | 707/740 |
| 2015/0189466 A1 | 7/2015 | Shifman | |
| 2016/0188902 A1* | 6/2016 | Jin | H04L 67/306 |
| | | | 726/28 |

OTHER PUBLICATIONS

Supplementary European Search Report for EP Application No. 16833930.7 dated Mar. 13, 2019 (12 pp.).

* cited by examiner

SYSTEMS AND METHODS FOR SMART HOME DATA STORAGE

BACKGROUND

The present disclosure, for example, relates to security and/or automation systems, and more particularly to system and methods for automatically copying and storing data (e.g., media) held on one or more computing devices.

Security and automation systems are widely deployed to provide various types of communication and functional features such as monitoring, communication, notification, and/or others. These systems may be capable of supporting communication with a user through a communication connection or a system management action.

It is common for individuals and families to generate significant amounts of media that documents events in their lives. For example, a family of four may operate four separate smart phones in addition to other computing devices such as tablet computers, laptop computers, cameras, etc. that the family uses to create media and other digital information such as pictures, video, social media, text messages, geo location, and the like. Many challenges exist related to capturing and storing the media, and determining what media and other information to store (or not to store).

SUMMARY

The present disclosure relates to systems and methods for capturing and storing data such as media. In the example above, the media and other electronic information generated by the family may be automatically copied and stored from their electronic devices when those devices are located within a predetermined geographic area (e.g., within a property monitored by a home automation/security system). The storage system may provide a central repository to easily store the media and whatever electronic information they choose to be captured from their electronic devices. In some embodiments, the storage system is considered a backup data storage system that stores copies of the media that originates and/or is stored on other electronic devices. The storage system may also automatically group the stored media based on certain criteria such as time period, location, event and source of the media. The storage system may cooperate with a security and/or automation system for a property such as a home or business.

One embodiment of the present disclosure relates to a method for storing data. The method includes detecting presence of one or more computing devices within a defined geographic area, automatically copying media stored on the one or more computing devices, storing the copied media on a backup storage device, and grouping the stored copied media by at least one of time period, location, event and a source of the copied media.

In one example, the method further includes transmitting the copied media to at least one of a social media platform and another computing device. The method may include automatically copying media when new media is detected on the one or more computing devices. The media may include at least one of video, pictures, social media posts and/or conversations, text messages, audio recordings, and geo location history. The method may include comparing the copied media to media previously stored on the backup storage device and storing copied media that is different from the previously stored media. The method may include automatically erasing at least some of the stored copied media according to predetermined rules.

The media may include security camera recordings from one or more cameras of a security system within the defined geographic area. The method may include controlling security features of a security system based on a detected location of the one or more computing devices. The one or more computing devices may include at least one of a smart phone, a table computer, a laptop computer, a digital camera, and a desktop computer. The defined geographic area may include a property monitored by an automation and/or security system. The one or more computing devices may include a mobile computing device. The method may include providing remote access to the stored copied media from any of the one or more computing devices.

Another embodiment of the present disclosure relates to an apparatus for storing media with a security and/or automation system. The apparatus includes a processor, memory in electronic communication with the processor, and instructions stored in the memory. The instructions are executable by the processor to detect presence of a plurality of computing devices within a defined geographic area, detect new media on any one of the plurality of computing devices, automatically copy the new media, and store the copied new media on a backup storage device of the security and/or automation system.

In one example, the instructions are further executable by the processor to group the stored copied new media by at least one of time period, location, event, and which of the plurality of computing devices the new media is copied from. The instructions may be further executable by the processor to detect the new media, copy the new media, and store the copied new media based on predefined rules. The one or more computing devices may include at least one of a smart phone, a table computer, a laptop computer, a digital camera, and a desktop computer. The defined geographic area may include a property monitored by an automation and/or security system. The media may include at least one of video, pictures, social media posts and/or conversations, text messages, audio recordings, and geo location history. The instructions may be further executable by the processor to transmit the copied new media to one or more of the plurality of computing devices.

A further embodiment is directed to a non-transitory computer-readable medium storing computer-executable code. The code is executable by a processor to detect presence of one or more computing devices within a defined geographic area, automatically detect new media on any one of the one or more computing devices, automatically copy the new media, store the copied new media on a backup storage device, and group the stored copied new media by at least one of time period, location, event and a source of the new media.

The foregoing has outlined rather broadly the features and technical advantages of examples according to this disclosure so that the following detailed description may be better understood. Additional features and advantages will be described below. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein—including their organization and method of operation—together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following a first reference label with a dash and a second label that may distinguish among the similar components. However, features discussed for various components—including those having a dash and a second reference label—apply to other similar components. If only the first reference label is used in the specification, the description is applicable to any one of the similar components having the same first reference label irrespective of the second reference label.

DETAILED DESCRIPTION

The systems and method disclosed herein may provide data acquisition, data storage, and grouping or organization of stored data. The data may be in the form of media such as pictures, video, audio, social media, text messages, and geo location information. The data may be generated on one or more computing devices such as a mobile computing device (e.g., smart phone, laptop computer or tablet computer) or a stationary computing device (e.g., desktop computer). In one embodiment, a data storage system may operate to identify data stored on one or more computing devices and automatically make copies of the data and store the data.

Depending on the operating system platform, the system may utilize geo location information as part of determining when to identify the data stored on the one or more computing devices, and which computing devices to communicate with for purposes of accessing the data. In some embodiments, the system copies and stores new data whenever it detects new data on the computing device and the computing device is determined to be within a defined geographic area. The system may organize the stored data based on various criteria, which may be established by the user. The system may also be configured to archive video clips from a security and/or automation system. A user may establish criteria for when data expires and how long to keep the stored media. The system may determine presence of a user (and an associated computing device) in the home, as well as detect presence outside of the home, and provide control of aspect of a security and/or automation system while users are outside the home.

The following description provides examples and is not limiting of the scope, applicability, and/or examples set forth in the claims. Changes may be made in the function and/or arrangement of elements discussed without departing from the scope of the disclosure. Various examples may omit, substitute, and/or add various procedures and/or components as appropriate. For instance, the methods described may be performed in an order different from that described, and/or various steps may be added, omitted, and/or combined. Also, features described with respect to some examples may be combined in other examples.

Figure 1:
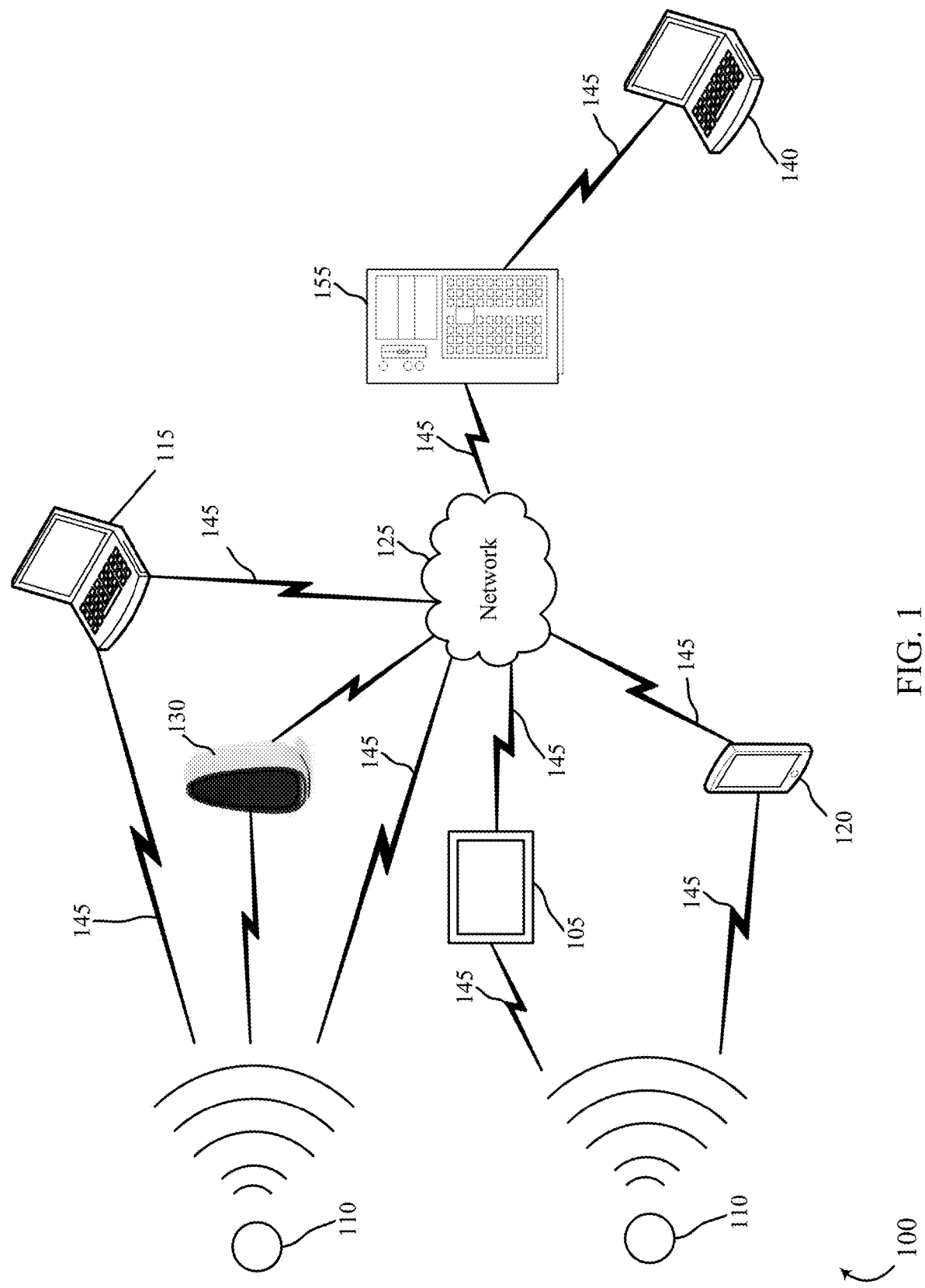
FIG. 1 is a block diagram of an example of a security and/or automation system in accordance with various embodiments.

FIG. 1 is an example of a communications system 100 in accordance with various aspects of the disclosure. In some embodiments, the communications system 100 may include control panel 105, one or more sensor units 110, local computing devices 115, 120, network 125, a storage device 130, remote computing device 140, and server 155. One or more sensor units 110 may communicate via wired or wireless communication links 145 with one or more of the local computing device 115, 120 or network 125. The network 125 may communicate via wired or wireless communication links 145 with the control panel 105 and the remote computing device 140 via server 155. In alternate embodiments, the network 125 may be integrated with any one of the local computing device 115, 120, remote computing device 140, or server 155, such that separate components are not required.

Local computing device 115, 120 and remote computing device 140 may be custom computing entities configured to interact with sensor units 110 via network 125, and in some embodiments, via server 155. In other embodiments, local computing device 115, 120 and remote computing device 140 may be general purpose computing entities such as a personal computing device, for example, a desktop computer, a laptop computer, a netbook, a tablet personal computer (PC), a control panel, an indicator panel, a multi-site dashboard, an iPod®, an iPad®, a smart phone, a mobile phone, a personal digital assistant (PDA), and/or any other suitable device operable to send and receive signals, store and retrieve data, and/or execute modules. Any of the computing devices 115, 120, 140 may be mobile computing devices that are carried by and associated with a particular user.

Control panel 105 may be a smart home system panel, for example, an interactive panel mounted on a wall in a user's home. Control panel 105 may be in direct communication via wired or wireless communication links 145 with the one or more sensor units 110, or may receive sensor data from the one or more sensor units 110 via local computing devices 115, 120 and network 125, or may receive data via remote computing device 140, server 155, and network 125.

The local computing devices 115, 120 may include memory, a processor, an output, a data input and a communication module. The processor may be a general purpose processor, a Field Programmable Gate Array (FPGA), an Application Specific Integrated Circuit (ASIC), a Digital Signal Processor (DSP), and/or the like. The processor may be configured to retrieve data from and/or write data to the memory. The memory may be, for example, a random access memory (RAM), a memory buffer, a hard drive, a database, an erasable programmable read only memory (EPROM), an electrically erasable programmable read only memory (EEPROM), a read only memory (ROM), a flash memory, a hard disk, a floppy disk, cloud storage, and/or so forth. In some embodiments, the local computing devices 115, 120 may include one or more hardware-based modules (e.g., DSP, FPGA, ASIC) and/or software-based modules (e.g., a module of computer code stored at the memory and executed at the processor, a set of processor-readable instructions that may be stored at the memory and executed at the processor) associated with executing an application, such as, for example, receiving and displaying data from sensor units 110.

The processor of the local computing devices 115, 120 may be operable to control operation of the output of the local computing devices 115, 120. The output may be a television, a liquid crystal display (LCD) monitor, a cathode ray tube (CRT) monitor, speaker, tactile output device, and/or the like. In some embodiments, the output may be an integral component of the local computing devices 115, 120. Similarly stated, the output may be directly coupled to the processor. For example, the output may be the integral display of a tablet and/or smart phone. In some embodiments, an output module may include, for example, a High Definition Multimedia Interface™ (HDMI) connector, a Video Graphics Array (VGA) connector, a Universal Serial Bus™ (USB) connector, a tip, ring, sleeve (TRS) connector, and/or any other suitable connector operable to couple the local computing devices 115, 120 to the output.

The backup storage device 130 may be a computing entity operable to store various types of data. In addition to storage capability, backup storage device 130 may include other features and functionality, such as a processor, a user interface, memory, and the like that provide options for operating backup storage device to store, sort, manage, manipulate, and group data according to certain criteria. In one embodiment, backup storage device 130 is operable to store media in the form of, for example, at least one of video, pictures, social media posts and/or conversations, text messages, audio recordings, and geo location history. The media may be grouped on backup storage device 130 based on, for example, at least one of time period, location, event and a source of the copied media. A user may select among various grouping options via a user interface of the backup storage device 130. Alternatively, the grouping options may be established at a different device (e.g., on control panel 105 or via at least one of computing devices 115, 120, 140) and communicated to backup storage device 130.

The backup storage device 130 may be operable to analyze the data stored thereon and automatically perform actions in response to predetermined criteria. For example, backup storage device 130 may receive data from a plurality of sources (e.g., two or more of computing devices 115, 120), and the backup storage device 130 may identify that at least some of the received data is redundant or duplicative. The backup storage device 130 may delete the redundant or duplicative data as part of storing, grouping, etc. the data. In another example, the backup storage device 130 may store data on a first in/first out basis where the data is automatically deleted after a certain amount of data has been stored, or may delete data automatically after a certain time period as expired. The backup storage device 130 may automatically transmit some types of data to other devices, networks, and the like, such as posting pictures or video to a social networking site.

The backup storage device 130 may be used to store data associated with a security and/or automation system. The computing devices 115, 120 and sensor units 110 may be components of a security and/or automation system of a property, and at least some of the data generated by the security and/or automation system (e.g., video footage, etc.) may be stored on the backup storage device 130.

The backup storage device 130 may be part of a network of backup storage devices 130. In one embodiment, a backup storage device 130 is positioned in each of a plurality of homes and/or businesses, and the data generated and/or associated with a given property may be stored at least in part on the backup storage device 130 for that property and may be stored at least in part on a backup storage device 130 located at another property. The backup storage device 130 may be partitioned into different segments that are dedicated for storage of different types of data and/or data originating from various geographic locations, computing devices, and/or backup storage devices.

The remote computing device 140 may be a computing entity operable to enable a remote user to monitor the output of the sensor units 110. The remote computing device 140 may be functionally and/or structurally similar to the local computing devices 115, 120 and may be operable to receive data streams from and/or send signals to at least one of the sensor units 110 via the network 125. The network 125 may be the Internet, an intranet, a personal area network, a local area network (LAN), a wide area network (WAN), a virtual network, a telecommunications network implemented as a wired network and/or wireless network, etc. The remote computing device 140 may receive and/or send signals over the network 125 via communication links 145 and server 155.

In some embodiments, the one or more sensor units 110 may be sensors configured to conduct periodic or ongoing automatic measurements related to data (e.g., media) stored on a computing device such as any of computing devices 115, 120, 140. Each sensor unit 110 may be capable of sensing multiple data-related parameters, or alternatively, separate sensor units 110 may monitor separate data-related parameters. In another example, one or more sensor units 110 may measure geo location information related to the computing devices 115, 120, 140, while another sensor unit 110 (or, in some embodiments, the same sensor unit 110) may detect presence of one or more persons and/or the geographic information associated with a computing device carried by the one or more persons. In some embodiments, one or more sensor units 110 may additionally monitor alternate security and/or automation parameters, such as motion detection, operation of appliances such as an HVAC system, camera operation, and the like. Sensor units 110 may monitor a variety of information related to a computing device beyond the data stored on and/or generated on a computing device such as functions carried out by the computing device (e.g., social media communications, text messages, telephone calls, software operation, and the like.

Data gathered by the one or more sensor units 110 may be communicated to local computing device 115, 120, which may be, in some embodiments, a thermostat or other wall-mounted input/output smart home display, or may be communicated to control panel 105 and/or backup storage device 130. In other embodiments, local computing device 115, 120 may be a personal computer or smart phone. Where local computing device 115, 120 is a smart phone, the smart phone may have a dedicated application directed to communicating with the sensor units 110 and/or control panel 105. The local computing device 115, 120 may process the data received from the one or more sensor units 110 to obtain, for example, geo location information. In alternate embodiments, backup storage device 130 and/or remote computing device 140 may process the data received from the one or more sensor units 110, via network 125 and server 155, to obtain, for example, geo location information. Data transmission may occur via, for example, frequencies appropriate for a personal area network (such as BLUETOOTH® or IR communications) or local or wide area network frequencies such as radio frequencies specified by the IEEE 802.15.4 standard.

In some embodiments, local computing device 115, 120 and/or backup storage device 130 may communicate with remote computing device 140 or control panel 105 via network 125 and server 155. Examples of networks 125 include cloud networks, local area networks (LAN), wide area networks (WAN), virtual private networks (VPN), wireless networks (using 802.11, for example), and/or cellular networks (using 3G and/or LTE, for example), etc. In some configurations, the network 125 may include the Internet. In some embodiments, a user may access the functions of control panel 105, local computing device 115, 120 and/or backup storage device 130 from remote computing device 140. For example, in some embodiments, remote computing device 140 may include a mobile application that interfaces with one or more functions of control panel 105, local computing device 115, 120 and/or backup storage device 130.

The server 155 may be configured to communicate with the control panel 105, the sensor units 110, the local computing devices 115, 120, the backup storage device 130, and/or the remote computing device 140. The server 155 may perform additional processing on signals received from the sensor units 110 or local computing devices 115, 120, or may simply forward the received information to the remote computing device 140 and control panel 105.

Server 155 may be a computing device operable to receive data streams (e.g., from sensor units 110, local computing device 115, 120, backup storage device 130, or remote computing device 140), store and/or process data, and/or transmit data and/or data summaries (e.g., to remote computing device 140). Control panel 105 and/or backup storage device 130 may also receive data streams such as a stream of geo location data from a sensor unit 110 or computing device 115, 120, a stream of media detection data from the same or a different sensor unit 110 or computing device 115, 120, or a stream of device operation data from either the same or yet another sensor unit 110 and/or computing device 115, 120. In some embodiments, control panel 105, backup storage device 130 and/or server 155 may "pull" the data streams, e.g., by querying one or more of the control panel 105, the sensor units 110, the local computing devices 115, 120, and/or the remote computing device 140. In some embodiments, the data streams may be "pushed" from the control panel 105, the sensor units 110, and/or the local computing devices 115, 120 to the backup storage device 130 and/or server 155. For example, the control panel 105, sensor units 110, the local computing device 115, 120, and/or the backup storage device 130 may be configured to transmit data as it is generated by or entered into that device. In some instances, the control panel 105, the sensor units 110, the local computing devices 115, 120, and/or backup storage device 130 may periodically transmit data (e.g., as a block of data or as one or more data points).

The control panel 105 and/or backup storage device 130 may include a database (e.g., in memory) containing media-related and/or geo location-related data received from the sensor units 110 and/or the local computing devices 115, 120. Additionally, as described in further detail herein, software (e.g., stored in memory) may be executed on a processor of the control panel 105 and/or backup storage device 130. Such software (executed on the processor) may be operable to cause the control panel 105 and/or backup storage device 130 to monitor, process, summarize, present, and/or send a signal associated with, for example, media-related and/or geo location-related data.

Figure 2:
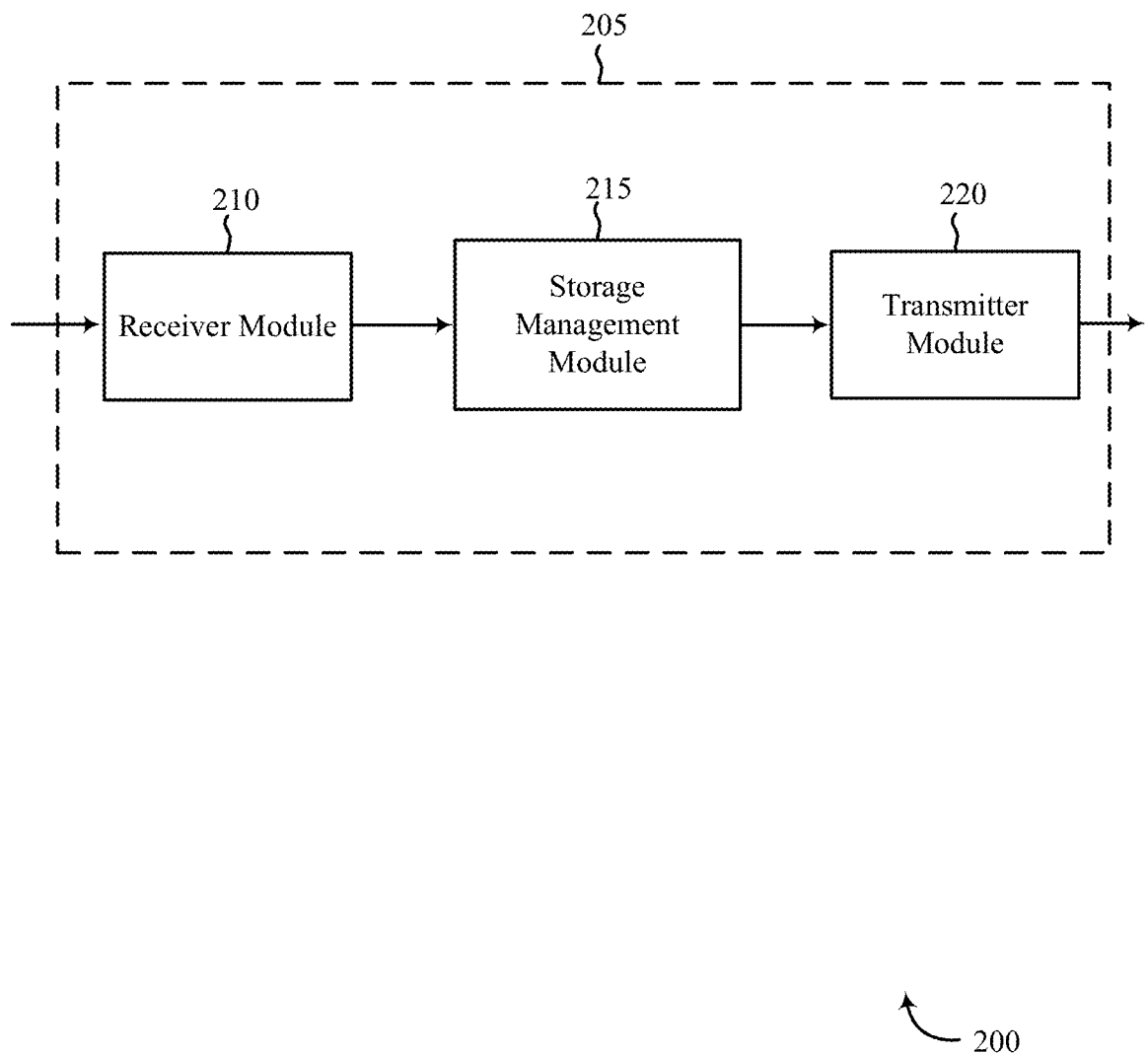
FIG. 2 shows a block diagram of a device relating to a security and/or an automation system, in accordance with various aspects of this disclosure.

FIG. 2 shows a block diagram 200 of a device 205 for use in electronic communication, in accordance with various aspects of this disclosure. The device 205 may be an example of one or more aspects of a control panel 105 described with reference to FIG. 1, or a backup storage device 130 described also described with reference to FIG. 1. The device 205 may include a receiver module 210, a storage management module 215, and/or a transmitter module 220. The device 205 may also be or include a processor. Each of these modules may be in communication with each other—directly and/or indirectly.

The components of the device 205 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each module may also be implemented—in whole or in part—with instructions embodied in memory formatted to be executed by one or more general and/or application-specific processors.

The receiver module 210 may receive information such as packets, user data, and/or control information associated with various information channels (e.g., control channels, data channels, etc.). The receiver module 210 may be configured to receive data, such media data, for purposes of storing the data on the device 205. In other embodiments, receiver module 210 may receive instructions related to operation of device 205 and/or handling the received data intended to be stored on device 205. Information and/or data may be passed on to the storage management module 215, and to other components of the device 205.

The storage management module 215 may operate to store data at device 205. The stored data may be in the form of, for example, media that is generated by device 205 or by a computing device separate from device 205. Storage management module 215 may operate to analyze and/or manipulate the stored data. For example, storage management module 215 may group the data according to certain criteria such as, for example, the type of data (e.g., picture, video, text message, social media posting, or the like), a location where the data was generated, a time frame within which the data was generated, a device upon which the data was generated, a particular user of a device, the size of the data file, etc. The criteria by which the storage management module 215 groups or organizes the stored data may be customized by a user of device 205. Alternatively, the criteria may be pre-entered and/or predetermined for a particular device 205. In yet further examples, the criteria may be established or entered via a device or user interface separate from device 205, and device 205 receives instructions that include the criteria by which storage management module 215 operates.

Storage management module 215 may also operate to detect certain data on other computing devices that may qualify for being stored on device 205. For example, storage management module 215 may communicate with one or more computing devices (e.g., computing devices 115, 120 described with reference to FIG. 1) and determine whether those computing devices include data that can be copied and/or transferred to device 205 for storage. The identified data may be new data that has been added within a certain time frame or since a last communication between storage management module 215 and the computing device. Other criteria may be used for determining which types of data, etc., generated by and/or held on one or more computing devices may be copied and/or transmitted to device 205. One of the criteria used may include a geolocation of the computing device with which storage management module 215 is in communication. In one example, storage management module 215 determines when a computing device is located within a predetermined geo fence, and then operates to detect whether that computing device carries data for copying and/or transferring to device 205. Further, storage management module 215 may operate to make a copy or otherwise obtain a copy of the data stored on the computing device.

Storage management module 215 may provide other functions such as, for example, facilitating remote access to device 205 and/or the data stored thereon from a remote location (e.g., via remote computing device 140). Storage management module 215 may operate to post some of the data stored on device 205 to a social media site, transfer data or copies thereof from device 205 to another computing device, network, or the like. In other examples, storage management module 215 may analyze the data stored on device 205 and determine if and when to delete certain data. Criteria used to determine when or what to delete may include, for example, a predetermined time frame, duplicate copies of data, data associated with a particular event, or the like.

The transmitter module 220 may transmit the one or more signals received from other components of the device 205. The transmitter module 220 may transmit data, such as certain data that has been stored on device 205 and is being transmitted to a different device and/or network. The transmitter module 220 may transmit information related to the data stored on device 205 and/or settings, diagnostics, file structures, and the like associated with the device 205. In some examples, the transmitter module 220 may be collocated with the receiver module 210 in a transceiver module.

Figure 3:
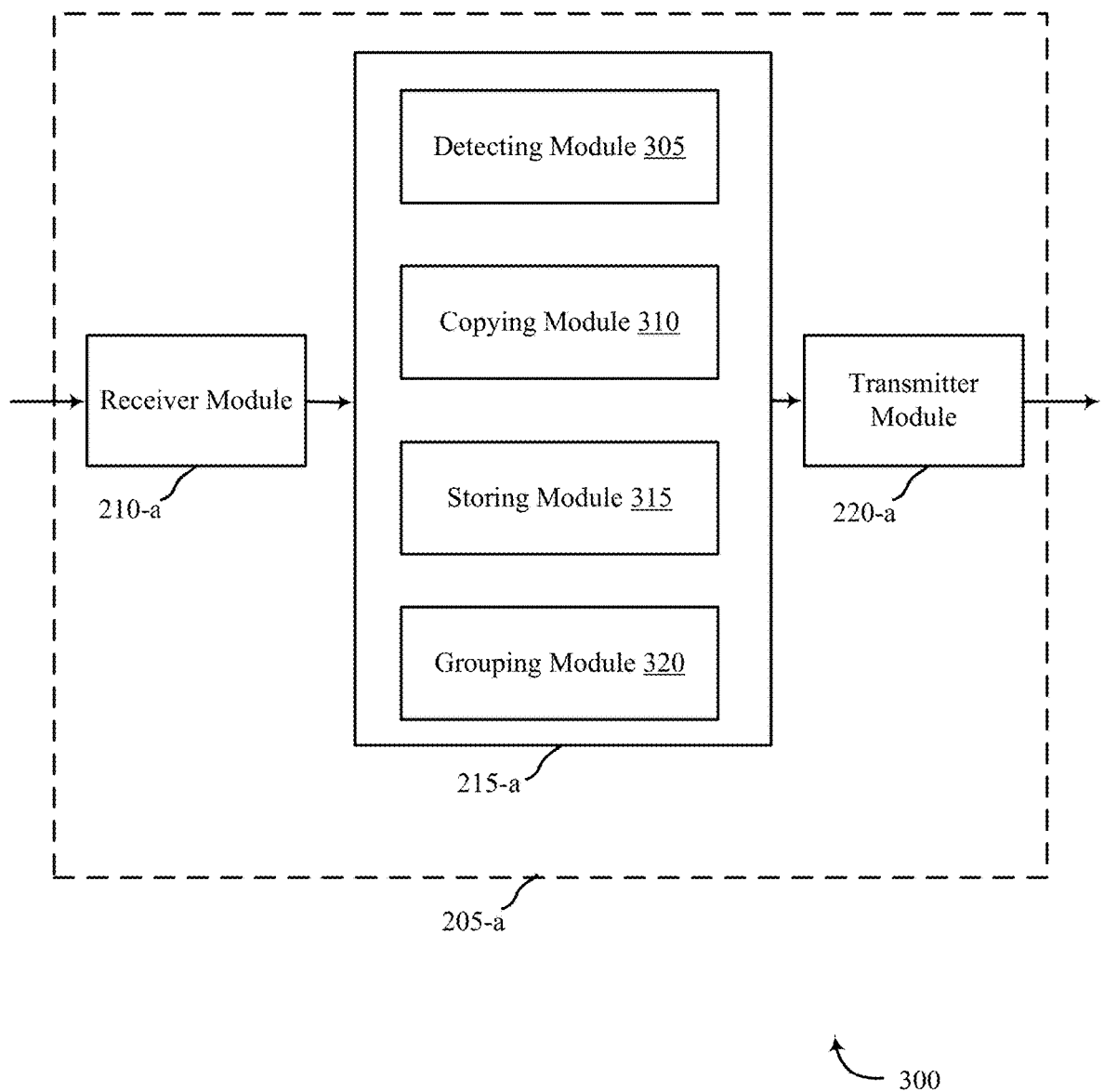
FIG. 3 shows a block diagram of a device relating to a security and/or an automation system, in accordance with various aspects of this disclosure.

FIG. 3 shows a block diagram 300 of a device 205-a for use in wireless communication, in accordance with various examples. The device 205-a may be an example of one or more aspects of a control panel 105 and/or the backup storage device 130 described with reference to FIG. 1. Device 205-a may also be an example of a device 205 described with reference to FIG. 2. The device 205-a may include a receiver module 210-a, a storage management module 215-a, and/or a transmitter module 220-a, which may be examples of the corresponding modules of device 205. The device 205-a may also include a processor. Each of these components may be in communication with each other. The storage management module 215-a may include a detecting module 305, a copying module 310, a storing module 315, and a grouping module 320. The receiver module 210-a and the transmitter module 220-a may perform the functions of the receiver module 210 and the transmitter module 220, of FIG. 2, respectively.

The detecting module 305 may be operable to detect at least one of data held on one or more computing devices separate from computing device 205-a for copying and/or transferring for purposes of storing that data, and detecting a computing device that may be carrying such data. The detecting of computing devices that carry data that may be copied and/or transferred may be carried out using a geolocation feature or device. For example, detecting module 305 may receive a notification when a computing device (e.g., computing device 115, 120 described with reference to FIG. 1) crosses a geo boundary and into a defined geographic area. In another example, detecting module 305 operates to detect when the computing device moves within a certain range or is maintained within a certain geographic range of device 205-a and/or a security and/or automation system that cooperates with device 205-a. The detecting module 305 may include geolocation components and/or capabilities as part of detecting location of the computing device that carries the target data.

In still further examples, a system or device separate from the device 205-a and the computing device carrying the target data may operate to provide geolocation information related to the proximity of the computing device relative to a defined geographic area. In one example, such a device may be a control panel of a security and/or automation system, a sensor (e.g., sensor unit 110), or the like. The device may communicate the geolocation related information regarding the computing device that carries the target data to the detecting module 305. In any of these embodiments, once detecting module 305 determines the presence of one or more computing devices within a defined geographic area, either directly or indirectly, storage management module 215 may operate additional modules and/or carry out further operational steps related to the copying, storing, grouping, or other function associated with certain data such as media.

The defined geographic area may, in at least one example, be a boundary associated with a property such as a home or a place of business. In one example, a user carrying a computing device such as a tablet computer or a smartphone may cross a geo boundary when entering a home. Once it is confirmed that the computing device carried by the user crosses the geo boundary into the home, detecting module 305 may confirm detection of one or more computing devices within a defined geographic area.

The copying module 310 may operate to obtain a copy of data (e.g., media) from one or more computing devices (e.g., computing devices 115, 120). Copying module 310 may transmit instructions to the computing devices as part of making and/or obtaining a copy of the data. Copying module 310 may transmit instructions through a network or series of devices including, for example, control panel 105 described above with reference to FIG. 1. In at least some embodiments, the copied data may be routed directly to device 205-a, wherein in other embodiments the copied data is routed through another computing device such as, for example, control panel 105.

The copying module 310 may make an assessment of what data to copy among various types of data available on a computing device. The type of data may be characterized in a number of ways including, for example, a time stamp or time period, a format (e.g., jpeg for a photograph or .wav for a video format), or a particular device used to generate the data (e.g., a smartphone versus a tablet computing device or laptop computing device). The copying module 310 may operate to automatically copy all available data, whereas other data may be evaluated based on a criteria or format before being copied.

The storing module 315 may operate to store data that is received from a computing device (e.g., computing device 115 to 120, a control panel 105, or a data storage device 130). The storing module 315 may select among various storage locations on device 205-*a* for storing the data. Alternatively, storing module 315 may determine whether certain data should be transmitted to another device for storage. For example, storing module 315 may determine that a backup copy of the data should be stored on a different device from device 205-*a*. A determination as to whether a backup copy should be made may depend at least in part on characteristics of the data.

A grouping module 320 may operate to group the data according to preset or customized criteria. For example, grouping module 320 may automatically group data in a certain format together in a common storage location. In another example, grouping module 320 may group data according to a geo location indicator related to where the data was generated, a certain device where the data was originated, a particular event or time period, or a purpose or function associated with the data.

Figure 4:
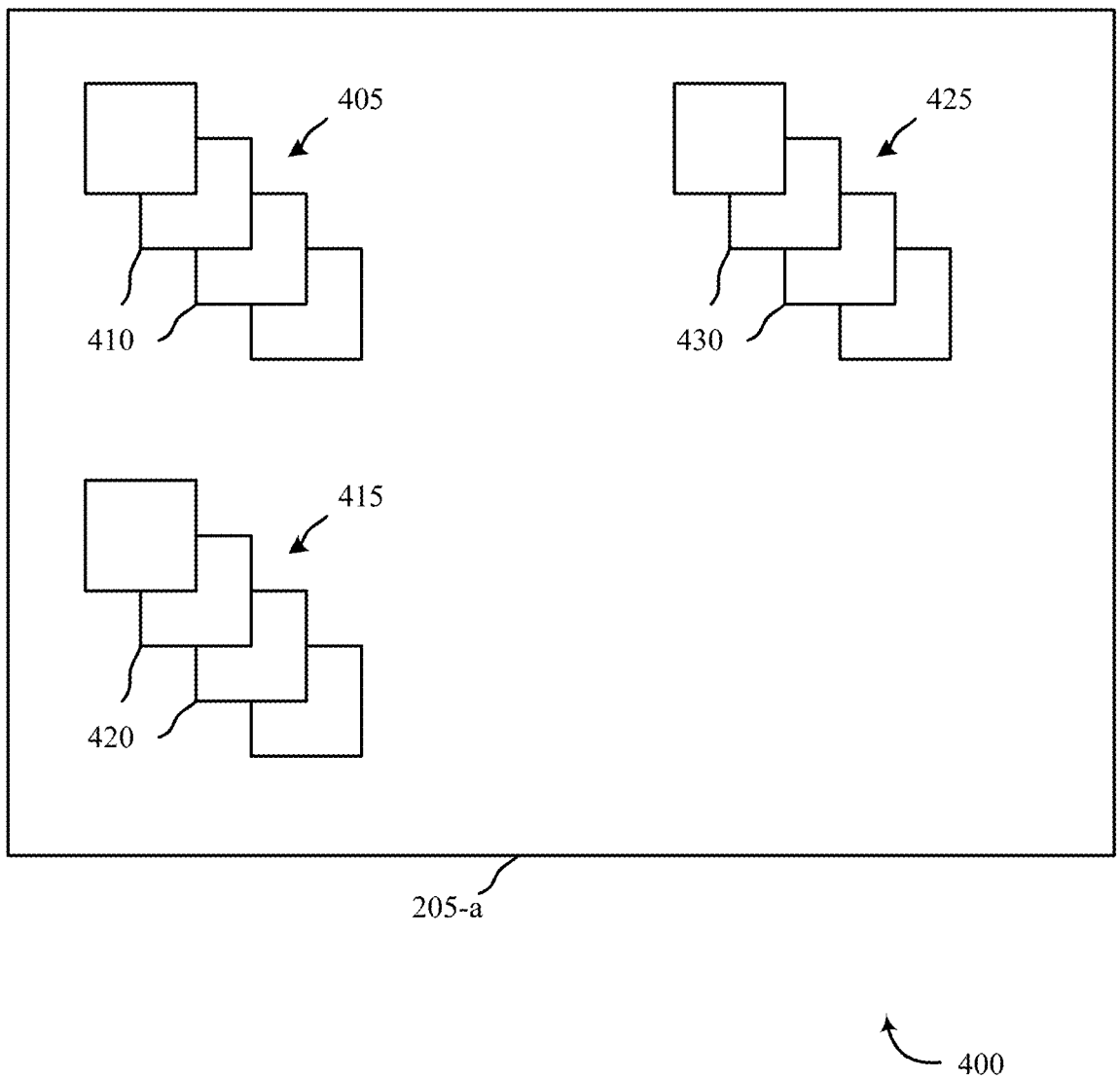
FIG. 4 shows a block diagram of a device display showing groupings of data, in accordance with various aspects of this disclosure.

Referring to FIG. 4, an example display 400 is shown including multiple groups of data 405, 415, 425. Each of the groups of data 405, 415, 425 includes a plurality of data files or media files (generally referred to as data) 410, 420, 430, respectively. Each of the groups 405, 415, 425 may comprise data of a certain category based on particular criteria. In one example, group 405 includes data from a first computing device, group 415 includes data from a second computing device, and group 425 includes data from a third computing device. In another example, group 405 includes data in the form of pictures, group 415 includes data in the form of video, and group 425 includes data in the form of at least one of social media posts, text messages, geo tracking information, telephone call records, video game scores, internet browser history, and the like.

In another embodiment, each of the groups 405, 415, 425 include data of a particular type collected from a plurality of different computing devices. For example, group 405 may include all photographs from the smartphones, digital cameras, and tablet computing devices of a family associated with a particular geographic location (e.g., a family vacation to the beach) or a particular time period that covers such a family vacation. The other groups 415, 425 may hold all of the data of other formats also associated with the family vacation. In a further embodiment, group 405 includes all of the data of any type collected from the various computing devices of the family associated with the time period or geo location associated with the family vacation.

In another example, at least one of groups 405, 415, 425 groups together data collected by a security and/or automation system for a particular time period. In one example, group 405 may include data received from cameras, motion sensors, door opening sensors, appliance usage sensors, glass break sensors, and the like for a period of time (e.g., 10 p.m. to 6 a.m. each night of the week, or for an entire period of time while a family is out of town). In a further embodiment, each of groups 405, 415, 425 may store data from certain types or classes of components of a security and/or automation system.

Referring again to FIG. 3, the storage management module 215-*a* may operate to erase certain data based on predetermined criteria. In the example of the storage of data from a security and/or automation system described above with reference to FIG. 4, at least some of the groups 405, 415, 425 may remove or delete data on a periodic basis or in accordance with a storage limit associated with that group (e.g., a first in, first out basis). In another example related to the storage of data from a family's multiple computing devices described above with reference to FIG. 4, storage management module 215-*a* may automatically delete duplicate copies of certain data that may have been communicated between the plurality of computing devices for that family during the family vacation.

Figure 5:
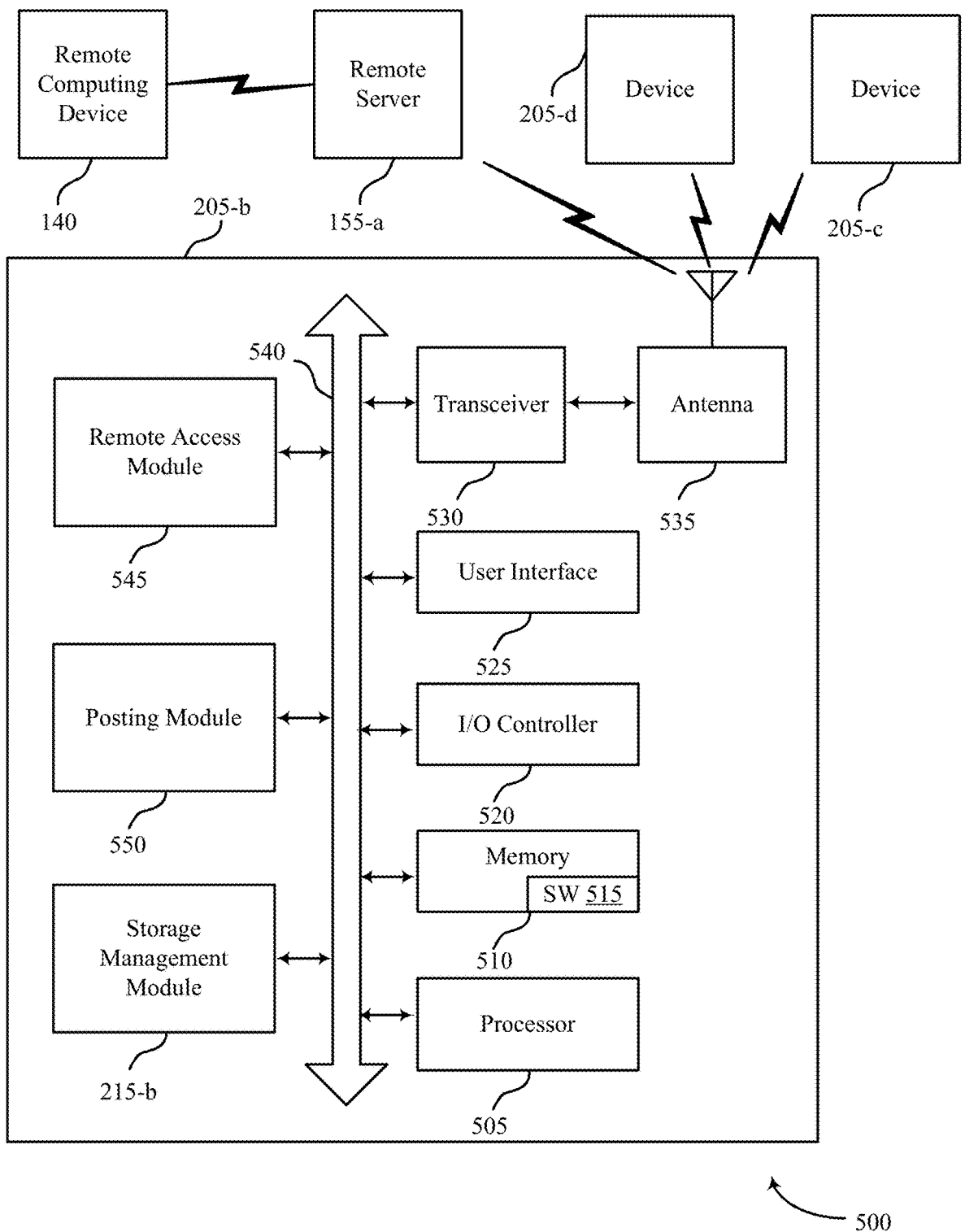
FIG. 5 shows a block diagram relating to a security and/or an automation system, in accordance with various aspects of this disclosure.

FIG. 5 shows a system 500 for use in data storage and/or data management systems, in accordance with various examples. System 500 may include a device 205-*b*, which may be an example of the control panels 105 and/or the storage devices 130 of FIG. 1. Device 205-*b* may also be an example of one or more aspects of devices 205 and/or 205-*a* of FIGS. 2 and 3.

Device 205-*b* may include a remote access module 545 and a posting module 550 in addition to the storage management module 215-*b*, which may be an example of storage management modules 215 described with reference to FIGS. 2 and 3.

Device 205-*b* may also include components for bi-directional voice and data communications including components for transmitting communications and components for receiving communications. For example, device 205-*b* may communicate bi-directionally with one or more of computing device 115-*a*, one or more sensors 150-*a*, remote computing device 140, and/or remote server 155-*a*, which may be an example of the remote server of FIG. 1. This bi-directional communication may be direct (e.g., device 205-*b* communicating directly with remote computing device 140) or indirect (e.g., device 205-*b* communicating indirectly with remote server 155-*a* through remote computing device 140).

The remote access module 545 may operate to provide access of device 205-*b* from a remote location such as by remote computing device 140 shown in FIG. 1. Remote access module 545 may provide access to data stored on device 205-*b*, or data that is accessible to device 205-*b*. Remote access module 545 may provide a display of data, data groupings, and other details regarding the stored data. Other metrics associated with the data may also be provided via remote access module 545. In one embodiment, remote access module 545 may facilitate deletion of stored data, transfer of stored data to other computing devices, and/or grouping of data. Remote access module 545 may operate to permit control of any or all functions and aspects of device 205-*b* for a remote location.

The posting module 550 may operate to post certain of the stored data and/or copied data from a computing device to a network, other computing device, a display, or the like. For example, posting module 550 may automatically post certain data (e.g., pictures) to a social media site. The data may be selected on predetermined criteria such as, for example, a picture format, a time of day, a geo location, or the like. Alternatively, the user may manually post the data to a social media site by providing instructions via posting module 550. Device 205-*b* may connect wirelessly with the internet via antenna 535 to facilitate posting to a social media site.

The device 205-*b* may communicate wirelessly with a plurality of other devices 205-*c*, 205-*d*, etc. In one example, device 205-*b* is a control panel (e.g., control panel 105), device 205-*c* is a data storage device (e.g., data storage device 130), and device 205-*d* is a computing device (e.g., computing device 115, 120). In other examples, device 205 is the computing device 115, 120, and devices 205-*c* and 205-*d* include one or more control panels 105 and/or one or more data storage devices 130. In a still further embodiment, device 205-*b* is an example of data storage device 130, device 205-*c* and device 205-*d* include one or more control panels 105 and/or one or more computing devices 115, 120.

Accordingly, the storage management module 215-*b* may be operated by any one of a control panel, data storage device and computing device.

Device 205-*b* may also include a processor module 505, and memory 510 (including software/firmware code (SW) 515), an input/output controller module 520, a user interface module 525, a transceiver module 530, and one or more antennas 535 each of which may communicate—directly or indirectly—with one another (e.g., via one or more buses 540). The transceiver module 530 may communicate bi-directionally—via the one or more antennas 535, wired links, and/or wireless links—with one or more networks or remote devices as described above. For example, the transceiver module 530 may communicate bi-directionally with one or more of computing device 115-*a*, remote computing device 140, and/or remote server 155-*a*. The transceiver module 530 may include a modem to modulate the packets and provide the modulated packets to the one or more antennas 535 for transmission, and to demodulate packets received from the one or more antennas 535. While a control panel or a control device (e.g., 205-*b*) may include a single antenna 535, the control panel or the control device may also have multiple antennas 535 capable of concurrently transmitting or receiving multiple wired and/or wireless transmissions. In some embodiments, one element of device 205-*b* (e.g., one or more antennas 535, transceiver module 530, etc.) may provide a direct connection to a remote server 155-*a* via a direct network link to the Internet via a POP (point of presence). In some embodiments, one element of device 205-*b* (e.g., one or more antennas 535, transceiver module 530, etc.) may provide a connection using wireless techniques, including digital cellular telephone connection, Cellular Digital Packet Data (CDPD) connection, digital satellite data connection, and/or another connection.

The signals associated with system 500 may include wireless communication signals such as radio frequency, electromagnetics, local area network (LAN), wide area network (WAN), virtual private network (VPN), wireless network (using 802.11, for example), 345 MHz, Z-WAVE®, cellular network (using 3G and/or LTE, for example), and/or other signals. The one or more antennas 535 and/or transceiver module 530 may include or be related to, but are not limited to, WWAN (GSM, CDMA, and WCDMA), WLAN (including BLUETOOTH® and Wi-Fi), WMAN (WiMAX), antennas for mobile communications, antennas for Wireless Personal Area Network (WPAN) applications (including RFID and UWB). In some embodiments, each antenna 535 may receive signals or information specific and/or exclusive to itself. In other embodiments, each antenna 535 may receive signals or information not specific or exclusive to itself.

In some embodiments, one or more sensors 150-*a* (e.g., motion, proximity, smoke, light, glass break, door, window, carbon monoxide, and/or another sensor) may connect to some element of system 500 via a network using one or more wired and/or wireless connections.

In some embodiments, the user interface module 525 may include an audio device, such as an external speaker system, an external display device such as a display screen, and/or an input device (e.g., remote control device interfaced with the user interface module 525 directly and/or through I/O controller module 520).

One or more buses 540 may allow data communication between one or more elements of device 205-*b* (e.g., processor module 505, memory 510, I/O controller module 520, user interface module 525, etc.).

The memory 510 may include random access memory (RAM), read only memory (ROM), flash RAM, and/or other types. The memory 510 may store computer-readable, computer-executable software/firmware code 515 including instructions that, when executed, cause the processor module 505 to perform various functions described in this disclosure (e.g., detect geo location information related to one or more computing device, receive and store data that has been copied from the one or more computing devices, group or organize the stored data according to certain criteria, etc.). Alternatively, the software/firmware code 515 may not be directly executable by the processor module 505 but may cause a computer (e.g., when compiled and executed) to perform functions described herein. Alternatively, the computer-readable, computer-executable software/firmware code 515 may not be directly executable by the processor module 505 but may be configured to cause a computer (e.g., when compiled and executed) to perform functions described herein. The processor module 505 may include an intelligent hardware device, e.g., a central processing unit (CPU), a microcontroller, an application-specific integrated circuit (ASIC), etc.

In some embodiments, the memory 510 can contain, among other things, the Basic Input-Output system (BIOS) which may control basic hardware and/or software operation such as the interaction with peripheral components or devices. For example, the storage management module 215-*b*, the remote access module 545 and/or the posting module 550 to implement the present systems and methods may be stored within the system memory 510. Applications resident with system 500 are generally stored on and accessed via a non-transitory computer readable medium, such as a hard disk drive or other storage medium. Additionally, applications can be in the form of electronic signals modulated in accordance with the application and data communication technology when accessed via a network interface (e.g., transceiver module 530, one or more antennas 535, etc.).

Many other devices and/or subsystems may be connected to one or may be included as one or more elements of system 500 (e.g., entertainment system, computing device, remote cameras, wireless key fob, wall mounted user interface device, cell radio module, battery, alarm siren, door lock, lighting system, thermostat, home appliance monitor, utility equipment monitor, and so on). In some embodiments, all of the elements shown in FIG. 5 need not be present to practice the present systems and methods. The devices and subsystems can be interconnected in different ways from that shown in FIG. 5. In some embodiments, an aspect of some operation of a system, such as that shown in FIG. 5, may be readily known in the art and are not discussed in detail in this application. Code to implement the present disclosure can be stored in a non-transitory computer-readable medium such as one or more of system memory 510 or other memory. The operating system provided on I/O controller module 520 may be iOS®, ANDROID®, MS-DOS®, MS-WINDOWS®, OS/2®, UNIX®, LINUX®, or another known operating system.

The transceiver module 530 may include a modem configured to modulate the packets and provide the modulated packets to the antennas 535 for transmission and/or to demodulate packets received from the antennas 535. While the control panel or control device (e.g., 205-*b*) may include a single antenna 535, the control panel or control device (e.g., 205-*b*) may have multiple antennas 535 capable of concurrently transmitting and/or receiving multiple wireless transmissions.

The device 205-*b* may include a storage management module 215-*b*, which may perform the functions described above for the storage management modules 215 of device 205 of FIGS. 2 and 3.

Figure 6:
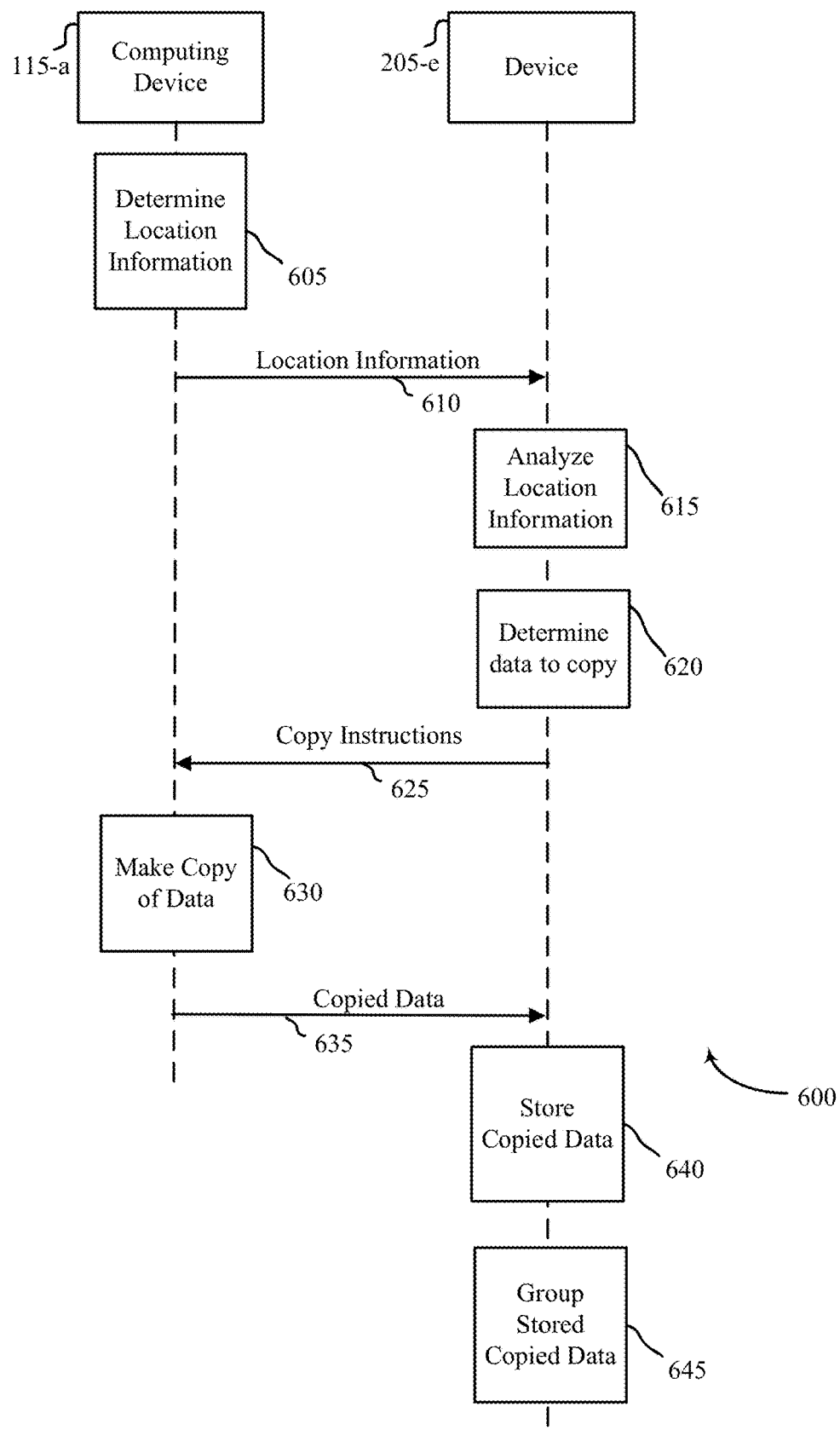
FIG. 6 shows a block diagram of an apparatus relating to a security and/or an automation system, in accordance with various aspects of this disclosure

FIG. 6 illustrates a block diagram of a system 600 having a computing device 115-*a* and a device 205-*e*. The computing device 115-*a* may be one example of the computing devices 115, 120, 140 described above with reference to FIG. 1. Device 205-*e* may be one example of the devices 205 described above with reference to FIGS. 2-3.

The system 600 illustrates operation of computing device 115-*a* to determine location information at a block 605. Location information 610 is transmitted to device 205-*e*. Device 205-*e* analyzes the location information at block 615, and determines data to copy at a block 620. The data may be carried by computing device 115-*a*. Device 205-*e* transmits copy instructions 625 back to computing device 115-*a*. Computing device 115-*a* makes a copy of the data at block 630 and sends copy data 635 back to device 205-*e*. Device 205-*e* stores the copied data at block 640. Device 205-*e* may also group the stored copied data at block 645. As described above, device 205-*e* may be a control panel or a data storage device. Computing device 115-*a* may include, for example, a smartphone, tablet computer, laptop computer, desktop computer, or a component of a home automation and/or security system.

Figure 7:
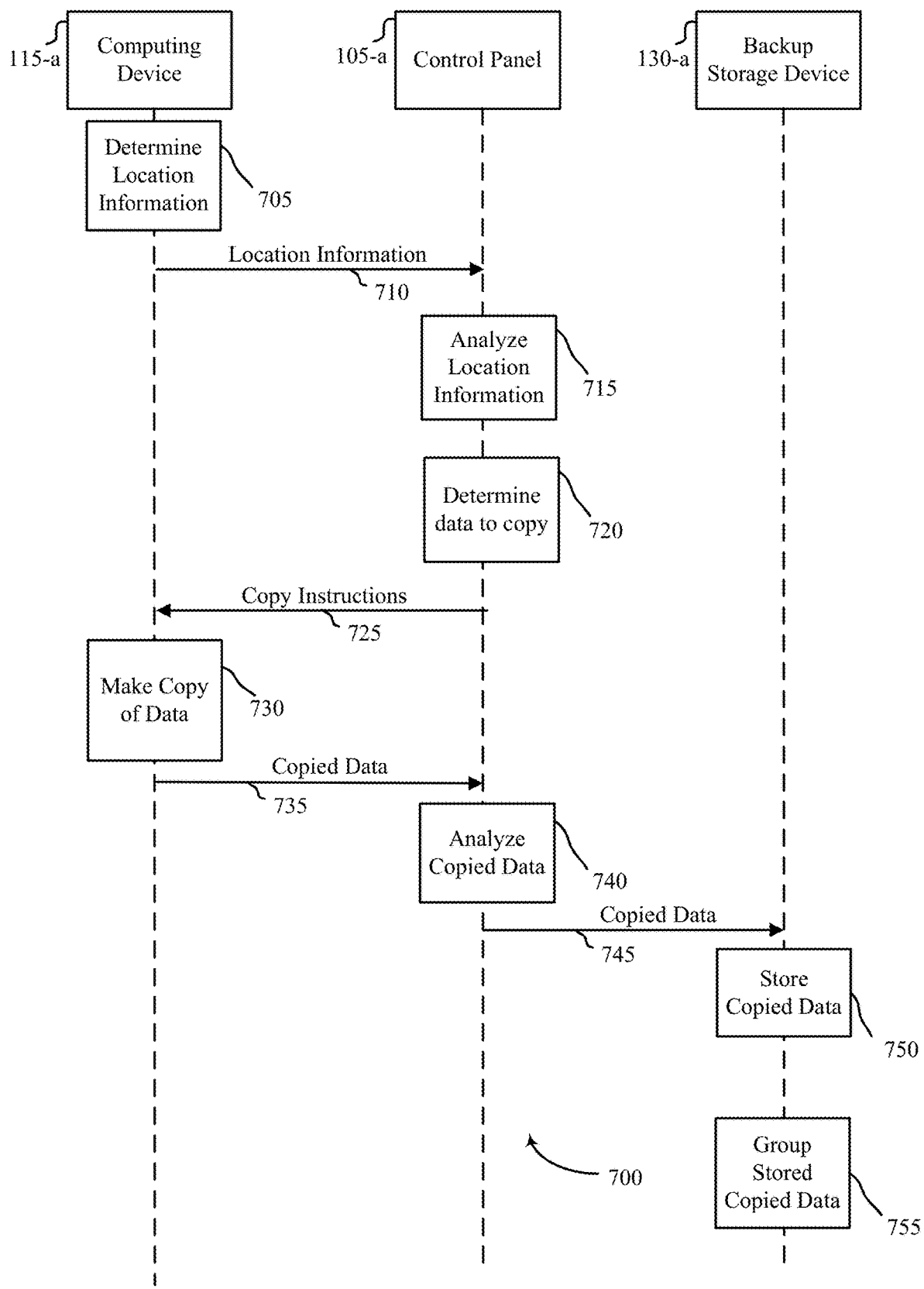
FIG. 7 shows a block diagram of an apparatus relating to a security and/or an automation system, in accordance with various aspects of this disclosure.

FIG. 7 shows a system 700 having a computing device 115-*a*, a control panel 105-*a*, and a backup storage device 130-*a*. The system 700 operates to store, group, copy, and/or manage data. Further, system 700 may utilize geolocation information as part of determining when to copy and/or store data and what data to store and/or copy.

Computing device 115-*a* may determine location information at block 705. The location information may relate to an absolute location of computing device 115-*a*, or a relative location of computing device 115-*a* to other systems and/or devices such as one or both of control panel 105-*a* and backup storage device 130-*a*. In one example, the location information may relate to a relative position of computing device 115-*a* to a property being monitored by a security and/or automation system. The security and/or automation system may establish a geo fence associated with the property, and the location information may relate to the computing device 115-*a* location relative to the geo fence.

The computing device 115-*a* may transfer location information 710 to control panel 105-*a*. Control panel 105-*a* may analyze the location information of block 715 and determine data to copy at block 720. Control panel 105-*a* transmits copy instruction 725 to computing device 115-*a*. Computing device 115-*a* then makes a copy of the data at block 730 and transmits the copied data 735 back to control panel 105-*a*. Control panel 105-*a* then analyzes the copied data at block 740 and transmits the copy data 745 to backup storage device 130-*a*. Backup storage device 130-*a* may store the copied data at block 750 and group the stored copied data at block 755.

In other embodiments, the copied data transmitted from computing device 115-*a* may be sent directly to backup storage device 130-*a* without being analyzed at control panel 105-*a*. In other embodiments, control panel 105-*a* may provide instructions for grouping the stored copied data, and deliver grouping instructions to the backup storage device 130-*a*. In still further embodiments, the backup storage device 130-*a* may analyze the location information instead of the control panel 105-*a* analyzing the location information, and further conducting a determination of the data to copy. The control panel 105-*a* may act as a pass through device through which location information, copy instructions, and copied data may be routed as part of communications between backup storage device 130-*a* and computing device 115-*a*.

In some embodiments, the computing device 115-*a*, the control panel 105-*a*, and backup storage device 130-*a* may communicate via a local area network such as, for example, a Wi-Fi or Bluetooth network and/or communication medium. In other embodiments, the components of system 700 may communicate via other communication mediums such as, for example, a cell phone network or satellite network. The defined geographic area within which the computing device 115-*a* must be located in order to transmit copied data from computing device 115-*a* to control panel 105-*a* and/or backup storage device 130-*a* may vary significantly depending on the communication medium (e.g., Wi-Fi, cellular network or satellite network) and other criteria. In at least one embodiment, the computing device 115-*a* may continuously and/or automatically transmit copied data to at least one of control panel 105-*a* and backup storage device 130-*a* regardless of the location of computing device 115-*a*.

Figure 8:
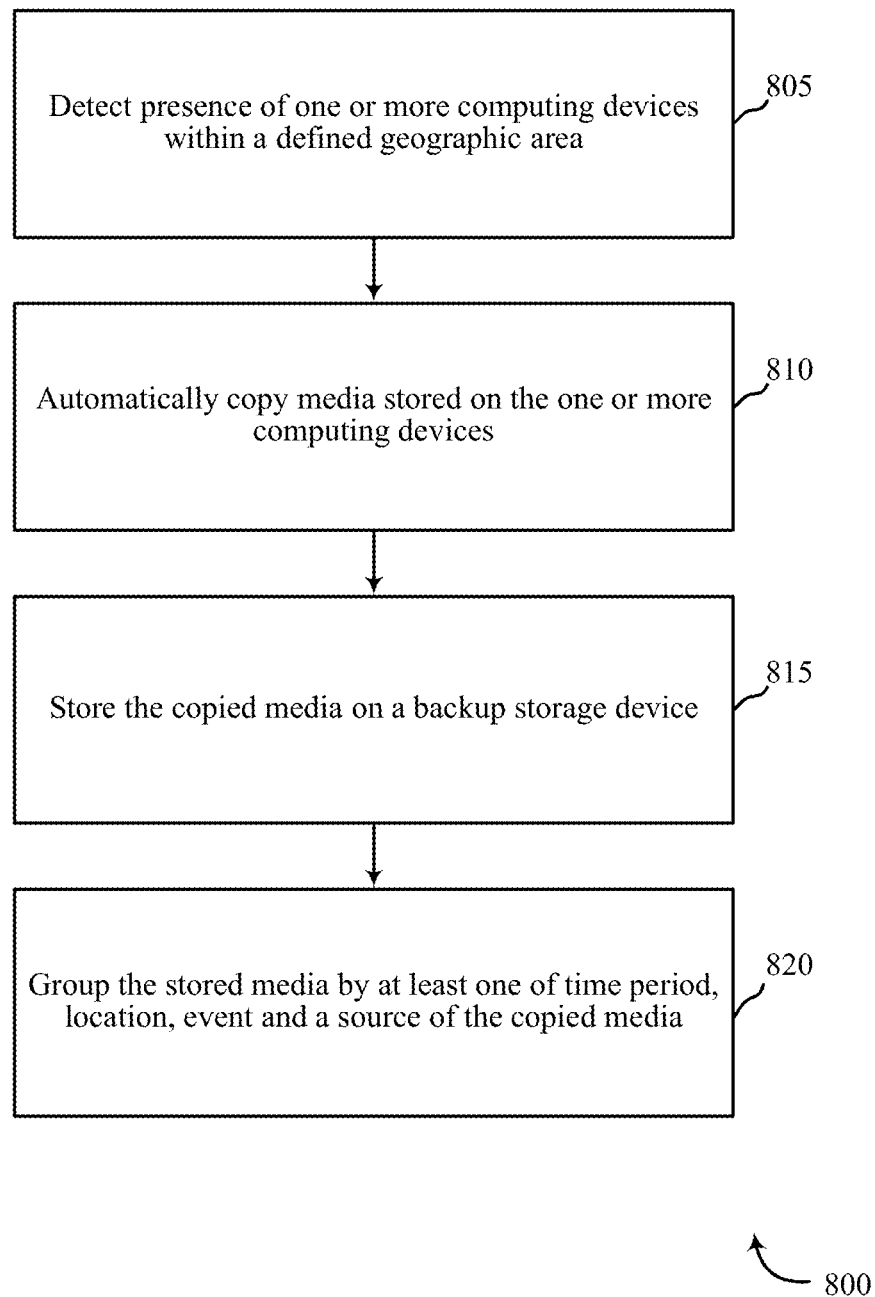
FIG. 8 is a flow chart illustrating an example of a method relating to a security and/or an automation system, in accordance with various aspects of this disclosure.

FIG. 8 is a flow chart illustrating an example of a method 800 for storing and/or managing data in accordance with various aspects of the present disclosure. For clarity, the method 800 is described below with reference to aspects of one or more of the storage management modules 215 described with reference to FIGS. 2-4, and/or aspects of one or more of the control panel 105 and storage device 130 described with reference to FIG. 1, and/or the devices 205 described with reference to FIGS. 2-4. In some examples, a control panel 105, storage device 130 and/or device 205 may execute one or more sets of codes to control the functional elements of the control panel 105, storage device 130 and/or device 205 to perform the functions described below. Additionally or alternatively, the control panel 105, storage device 130 and/or device 205 may perform one or more of the functions described below using special-purpose hardware.

At block 805, the method 800 may include detecting presence of one or more computing devices within a defined geographic area. At block 810, the method includes automatically copying media stored on the one or more computing devices, wherein media is one form of data. At block 815, the method includes storing the copied media on a backup storage device. Block 820 includes grouping the stored media by at least one of time period, location, event, and a source of the copied media.

As described above, the steps possible according to method 800 may be carried out using any one or a combination of a computing device (e.g., computing device 115, 120), a control panel (e.g., control panel 105), and a backup storage device (e.g., backup storage device 130). A storage management module (e.g., module 215 described herein) may be operated on any one of the computing device, control panel, and backup storage device, or a network device (e.g., server 155) that communicates with any one or all of the computing device, control panel, and backup storage device.

The operation(s) at blocks 805, 810, 815, 820 may be performed using the storage management module 215 described with reference to FIGS. 2-4 and/or an associated control panel 105, storage device 130 and/or device 205. Thus, the method 800 may provide for data storage and/or data management relating to automation/security systems. It should be noted that the method 800 is just one implementation and that the operations of the method 800 may be rearranged or otherwise modified such that other implementations are possible.

Figure 9:
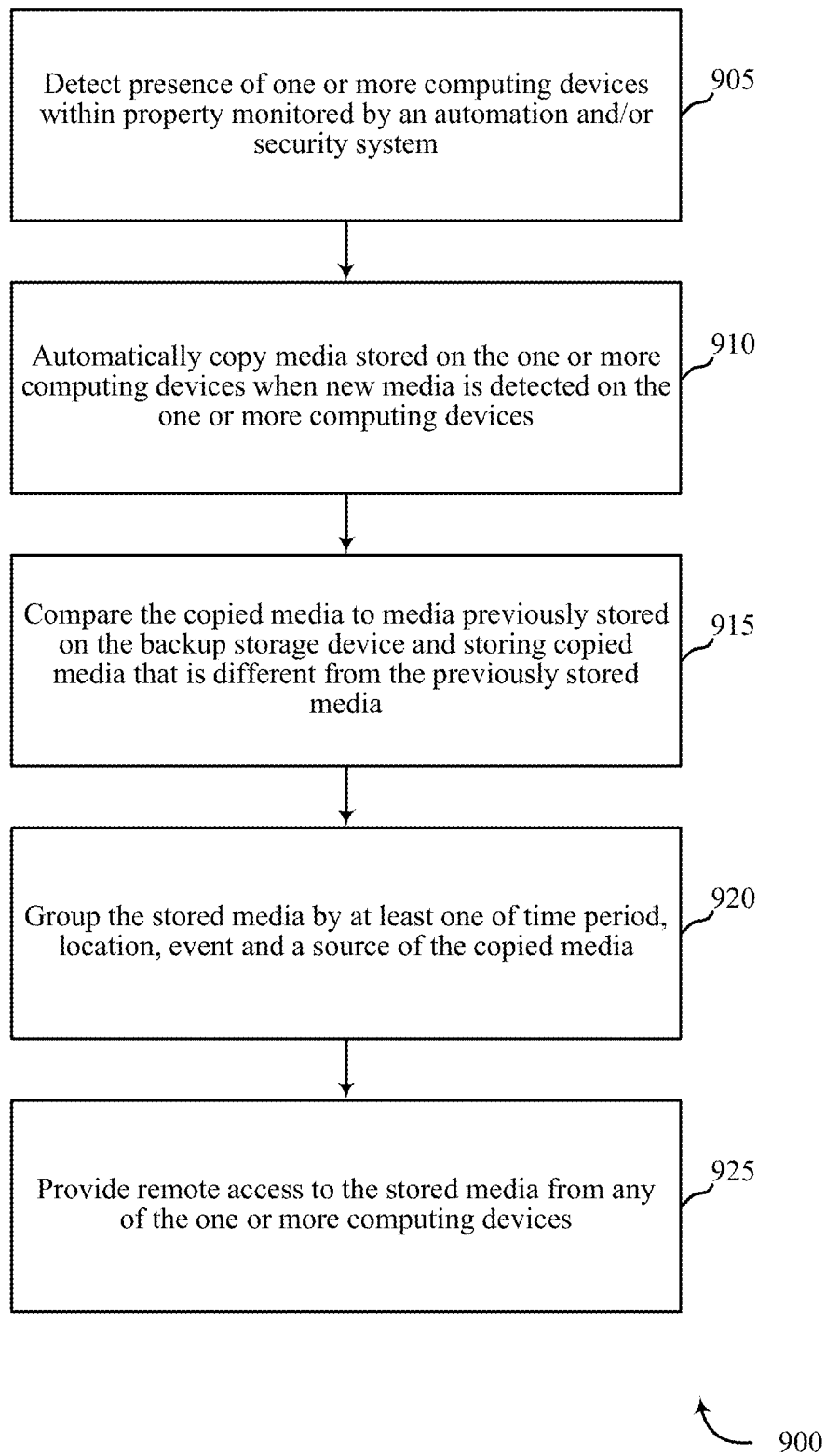
FIG. 9 is a flow chart illustrating an example of a method relating to a security and/or an automation system, in accordance with various aspects of this disclosure.

FIG. 9 is a flow chart illustrating an example of a method 900 for storing and/or managing data in accordance with various aspects of the present disclosure. For clarity, the method 900 is described below with reference to aspects of one or more of the storage management modules 215 described with reference to FIGS. 2-4, and/or aspects of one or more of the control panel 105 and storage device 130 described with reference to FIG. 1, and/or the devices 205 described with reference to FIGS. 2-4. In some examples, a control panel 105, storage device 130 and/or device 205 may execute one or more sets of codes to control the functional elements of the control panel 105, storage device 130 and/or device 205 to perform the functions described below. Additionally or alternatively, the control panel 105, storage device 130 and/or device 205 may perform one or more of the functions described below using special-purpose At block 905, the method 900 includes detecting the presence of one or more computing devices within a property monitored by an automation and/or security system. Block 910 includes automatically copying media stored on the one or more computing devices when new media is detected on the one or more computing devices. At block 915, the method includes comparing the copied media to media previously stored on the backup storage device, and storing copied media that is different from the previously stored media. At block 920, the method includes grouping the stored media by at least one of time, location, event and a source of the copied media. Block 925 includes providing remote access to the stored media from one or more of the computing devices.

The operation(s) at blocks 905, 910, 915, 920 may be performed using the storage management module 215 described with reference to FIGS. 2-4 and/or an associated control panel 105, storage device 130 and/or device 205. Thus, the method 900 may provide for data storage and/or data management relating to automation/security systems. It should be noted that the method 900 is just one implementation and that the operations of the method 900 may be rearranged or otherwise modified such that other implementations are possible.

In some examples, aspects from two or more of the methods 800, 900 may be combined and/or separated. It should be noted that the methods 800, 900 are just example implementations, and that the operations of the methods 800, 900 may be rearranged or otherwise modified such that other implementations are possible.

The detailed description set forth above in connection with the appended drawings describes examples and does not represent the only instances that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with this disclosure may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, and/or state machine. A processor may also be implemented as a combination of computing devices, e.g., a combination of a DSP and a microprocessor, multiple microprocessors, one or more microprocessors in conjunction with a DSP core, and/or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

In addition, any disclosure of components contained within other components or separate from other components should be considered exemplary because multiple other architectures may potentially be implemented to achieve the same functionality, including incorporating all, most, and/or some elements as part of one or more unitary structures and/or separate structures.

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM, DVD, or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed.

This disclosure may specifically apply to security system applications. This disclosure may specifically apply to automation system applications. In some embodiments, the concepts, the technical descriptions, the features, the methods, the ideas, and/or the descriptions may specifically apply to security and/or automation system applications. Distinct advantages of such systems for these specific applications are apparent from this disclosure.

The process parameters, actions, and steps described and/or illustrated in this disclosure are given by way of example only and can be varied as desired. For example, while the steps illustrated and/or described may be shown or discussed in a particular order, these steps do not necessarily need to be performed in the order illustrated or discussed. The various exemplary methods described and/or illustrated here may also omit one or more of the steps described or illustrated here or include additional steps in addition to those disclosed.

Furthermore, while various embodiments have been described and/or illustrated here in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may permit and/or instruct a computing system to perform one or more of the exemplary embodiments disclosed here.

This description, for purposes of explanation, has been described with reference to specific embodiments. The illustrative discussions above, however, are not intended to be exhaustive or limit the present systems and methods to the precise forms discussed. Many modifications and variations are possible in view of the above teachings. The embodiments were chosen and described in order to explain the principles of the present systems and methods and their practical applications, to enable others skilled in the art to utilize the present systems, apparatus, and methods and various embodiments with various modifications as may be suited to the particular use contemplated.

What is claimed is:

1. A method for storing data, comprising:
receiving a notification from one or more computing devices in response to the one or more computing devices crossing a geo boundary and into a geographic area defined by the geo boundary;
transmitting, to the one or more computing devices in response to receiving the notification, an instruction to copy new media generated by the one or more computing devices during a previous time period and currently stored on the one or more computing devices;
receiving, based at least in part on transmitting the instruction to copy the new media, one or more copies of the new media generated by the one or more computing devices during the previous time period, the new media currently stored on the one or more computing devices;
comparing the copied new media to media previously stored on a backup storage device;
storing the copied new media that is different from the previously stored media on the backup storage device; and
grouping the stored copied new media by the previous time period during which the stored copied new media was generated by the one or more computing devices, and a source device of the copied new media.

2. An apparatus for storing media with a security and/or automation system, comprising:
a processor;
memory in electronic communication with the processor; and
instructions stored in the memory, the instructions being executable by the processor to:
receive, from a plurality of computing devices, location information associated with the plurality of computing devices, the plurality of computing devices comprising security devices of the security and/or home automation system, the security devices comprising sensors for capturing security-related data;
detect, based at least in part on the location information, a location of at least one of the plurality of computing devices relative to a geo fence associated with a defined geographic area;
transmit, to at least one of the plurality of computing devices based at least in part on detecting the location of the at least one of the plurality of computing devices relative to the geo fence, an instruction to copy new media generated by the one or more computing devices during a previous time period and currently stored on at least one of the plurality of computing devices, the new media comprising the security-related data captured using the sensors of the security devices;
receive, based at least in part on transmitting the instruction to copy the new media, one or more copies of the new media generated by the one or more computing devices during the previous time period;
compare the copied new media to media previously stored on a backup storage device;
store the copied new media that is different from the previously stored media on the backup storage device of the security and/or automation system in a partition of the backup storage device that has been created for storing security-related data associated with the location of the plurality of computing devices, the backup storage device comprising a plurality of segments corresponding to different geographic locations of the security devices; and group the stored copied new media by the previous time period during which the stored copied new media was generated by the one or more computing devices, and which of the plurality of computing devices the new media is copied from.

3. A non-transitory computer-readable medium storing computer-executable code, the code executable by a processor to:

receive a notification from one or more computing devices in response to the one or more computing devices being within a geographic area defined by a geo boundary;

receive, from the one or more computing devices, location information associated with the one or more computing devices, the plurality of computing devices comprising security devices of a security and/or home automation system, the security devices comprising sensors for capturing security-related data;

detect, based at least in part on the location information, a location of at least one of the one or more computing devices relative to the geo boundary;

transmit, to the one or more computing devices, in response to receiving the notification and based at least in part on detecting the location of the one or more computing devices relative to the geo boundary, an instruction to copy new media generated by the one or more computing devices during a previous time period and currently stored on at least one of the one or more computing devices, the new media comprising the security-related data captured using the sensors of the security devices;

receive, based at least in part on the transmitted instruction to copy the new media, one or more copies of the new media generated by the one or more computing devices during the previous time period;

compare the copied new data to media previously stored on a backup storage device;

store the copied new media that is different from the previously stored data on the backup storage device in a partition of the backup storage device that has been created for storing security-related data associated with the location of the plurality of computing devices, the backup storage device comprising a plurality of segments corresponding to different geographic locations of the security devices; and group the stored copied new media by the previous time period during which the stored copied new media was generated by the one or more computing devices, and a source device of the new media.

4. The method of claim 1, further comprising transmitting the copied new media to at least one of a social media platform and another computing device.

5. The method of claim 1, wherein the new media includes at least one of video, pictures, social media posts and/or conversations, text messages, audio recordings, geo location history, and security camera recording from one or more cameras of a security system within the defined geographic area.

6. The method of claim 1, further comprising automatically erasing at least some of the stored copied new media according to predetermined rules.

7. The method of claim 1, further comprising: grouping the stored copied new media by at least one of location and event.

8. The method of claim 1, further comprising controlling security features of a security system based on a detected location of the one or more computing devices.

9. The method of claim 1, wherein the one or more computing devices include at least one of a smart phone, a table computer, a laptop computer, a digital camera, and a desktop computer.

10. The method of claim 1, wherein the defined geographic area is a property monitored by an automation and/or security system.

11. The method of claim 1, wherein the one or more computing devices are mobile computing devices.

12. The method of claim 1, further comprising providing remote access to the stored copied media from any of the one or more computing devices.

13. The method of claim 1, wherein the geo boundary comprises an entrance into a home.

14. The method of claim 1, further comprising grouping the stored copied new media according to a geo location indicator related to where the new media was generated.

15. The apparatus of claim 2, wherein the instructions are further executable by the processor to:

group the stored copied new media by location, or event.

16. The apparatus of claim 2, wherein the instructions are further executable by the processor to:

detect the new media, copy the new media, and store the copied new media based on predefined rules.

17. The apparatus of claim 2, wherein the plurality of computing devices include at least one of a smart phone, a table computer, a laptop computer, a digital camera, and a desktop computer.

18. The apparatus of claim 2, wherein the defined geographic area is a property monitored by the security and/or automation system.

19. The apparatus of claim 2, wherein the media includes at least one of video, pictures, social media posts and/or conversations, text messages, audio recordings, and geo location history.

20. The apparatus of claim 2, wherein the instructions are further executable by the processor to:

transmit the copied new media to one or more of the plurality of computing devices.

* * * * *